_United States Patent_ [19]

Geerdes

[11] 4,087,483

[45] May 2, 1978

[54] PREPARATION OF A PRINTING INK BINDER

[75] Inventor: Dirk J. F. Geerdes, Hoogerheide, Netherlands

[73] Assignee: Akzo N.V., Arnhem, Netherlands

[21] Appl. No.: 752,521

[22] Filed: Dec. 20, 1976

[30] Foreign Application Priority Data

Dec. 22, 1975 Netherlands .......................... 7514901

[51] Int. Cl.² ........................................... C08F 279/02
[52] U.S. Cl. ...................................... 260/879; 106/20;
260/33.6 UA
[58] Field of Search .......................................... 260/879

[56] References Cited

U.S. PATENT DOCUMENTS

| | | | |
|---|---|---|---|
| 2,608,550 | 8/1952 | Rowland | 526/73 |
| 2,692,254 | 10/1954 | Wassermann | 260/879 |
| 3,240,762 | 3/1966 | Wilks | 260/879 |
| 3,574,792 | 4/1971 | Hayashi | 260/894 |
| 3,775,381 | 11/1973 | Hayashi | 260/78.4 D |

FOREIGN PATENT DOCUMENTS 42-7334    1967    Japan.

_Primary Examiner_—Paul R. Michl
_Attorney, Agent, or Firm_—Stevens, Davis, Miller & Mosher

[57] ABSTRACT

A printing ink binder is prepared by reaction of a cyclopentadiene resin with an ethylenically unsaturated dicarboxylic acid or the anhydride thereof and with a saturated monocarboxylic acid having 3 – 9 carbon atoms at a temperature of 120° – 300° C, whereafter the acidic reaction mixture is at least partly esterified at a temperature of 140° – 300° C with one or more hydroxy and/or epoxy compounds whose average OH functionality is in the range of 2.1 to 12.

7 Claims, No Drawings

PREPARATION OF A PRINTING INK BINDER

This invention relates to a process for the preparation of a printing ink binder having a basis of a cyclopentadiene resin modified with carboxylic acid and subsequently esterified. British Pat. Specification No. 1 379 037 describes a binder obtained by reacting a cyclopentadiene resin with an unsaturated mono- or dicarboxylic acid and esterifying the reaction product with a monovalent alcohol. In said specification it is also mentioned that esterification with a polyvalent alcohol is undesirable in that the resulting solution is too viscous for printing ink. A disadvantage to this process is that modifying the cyclopentadiene resin with starting materials whose functionality is not higher than 2 will result in obtaining resins which are hardly crosslinked if at all and display an insufficiently rapid emission of solvent after application.

It is therefore an object of this invention to provide binders from which it is possible succesfully to prepare printing inks, more particularly rapid-drying rotogravure inks and offset inks. When used in rotogravure inks, binders for such printing inks must be very soluble in organic solvents such as toluene and/or petrol. When used in offset inks the binders must be sufficiently soluble in high-boiling hydrocarbons having a low aromatics content and mixable with oxidatively drying components such as linseed oil and air-drying alkyd resins. Both types of resulting printing inks must have a viscosity which is in keeping with the desired binder concentration. Further the binder must have an excellent pigment-wetting capacity and a high softening point, for instance above 130° C. Finally, the printing ink film must be rub-proof and be of uniform and high quality. Another object is to prepare a printing ink binder or a printing ink that exhibits a rapid emission of solvent or solvent mixture, a short drying time, a high gloss and a brilliant colour.

In accordance with this invention, the foregoing objects and requirements are accomplished by reacting a cyclopentadiene resin at a temperature in the range of 120° to 300° C with an ethylenically unsaturated dicarboxylic acid or the anhydride thereof and with a saturated monocarboxylic acid having 3 – 9 carbon atoms, and at least partly esterifying the resulting acidic reaction mixture at a temperature in the range of 140° to 300° C, with one or more hydroxy and/or epoxy compounds whose average OH functionality is in the range of 2.1 to 12.

By a cyclopentadiene resin is to be understood here a hydrocarbon-soluble resin obtained by polymerizing a mixture containing at least 50% by weight of cyclopentadiene, dicyclopentadiene and/or an alkyl derivative thereof at a temperature in the range of 200° to 350° C, in the presence or not of an inert hydrocarbon solvent. The monomer mixture to be polymerized may also contain componds such as styrene, alkyl derivatives of styrene, indene or other compounds liberated in the cracking of petroleum fractions. It is preferred that the resin should contain at least 70% by weight of cyclopentadiene, dicyclopentadiene and/or an alkyl derivative thereof, the alkyl group containing 1 – 4 carbon atoms. The softening point of the resin is in general in the range of 50° to 210° C, and preferably in the range of 70° to 140° C. The molecular weight of the resin is in general between 200 and 2000, and preferably between 300 and 1000.

According to the invention the cyclopentadiene resin is reacted with a specific saturated monocarboxylic acid. The amount of monocarboxylic acid used for this purpose is in general 0.01 to 1 mole, and preferably 0.02 to 0.8 moles per 100 grammes of resin. The reaction is generally carried out at a temperature in the range of 120° to 300° C, and preferably 200° to 260° C. The reaction pressure is not critical; the reaction is mostly carried out at atmospheric or elevated pressure. The reaction may be accelerated by using acidic catalysts, for instance sulphuric acid, phosphoric acid, perchloric acid, borium trifluoride or complex compounds thereof; the use of a catalyst, however, is not absolutely necessary. With due reserve Applicant supposes that the addition of the saturated monocarboxylic acid (represented as RCOOH) to the cyclopentadiene resin takes place with formation of an ester group by coupling an RCOO group and an H atom respectively to 2 carbon atoms of the resin which are linked by a double bond. By the introduction of ester groups which are directly attached to the cyclopentadiene resin the properties of the binder are very much improved unexpectedly; in this way there are obtained, for instance, a higher pigment wetting capacity and sometimes an improved solubility of the binder in an organic solvent and also a better heat stability, so that the resin will discolor less upon heating.

As examples of suitable monocarboxylic acids may be mentioned aromatic carboxylic acids, for instance: benzoic acid; aliphatic carboxylic acids, for instance: propionic acid, 2-methyl propionic acid, butyric acid, 3-methyl butyric acid, valeric acid, trimethyl propionic acid, caprylic acid, 2-ethyl caproic acid and trimethyl caproic acid; and cyclo-aliphatic monocarboxylic acids, for instance: hexahydrobenzoic acid and naphthenic acid. If desired, it is also possible to use mixtures of saturated monocarboxylic acids. It is preferred that aliphatic monocarboxylic acids with 6 – 9 carbon atoms should be used, more particularly those having a branched carbon chain.

The cyclopentadiene resin is reacted in a known way with an ethylenically unsaturated dicarboxylic acid or the anhydride thereof. In general, the reaction is carried out at temperatures in the range of 120° to 300° C and using 0.01 – 0.6 moles, preferably 0.02 – 0.4 moles, of the dicarboxylic acid or anhydride per 100 grammes of the non-modified cyclopentadiene resin.

As examples of suitable ethylenically unsaturated dicarboxylic acids may be mentioned: maleic acid, methyl maleic acid, fumaric acid, itaconic acid, mesaconic acid, citraconic acid, tetrahydrophthalic acid, methyl tetrahydrophthalic acid and other ethylenically unsaturated dicarboxylic acids having generally 4 – 10 carbon atoms or, if desired, the anhydrides of these acids. Also suitable for use are mixtures of ethylenically unsaturated dicarboxylic acids and/or anhydrides thereof. It is preferred that maleic anhydride should be used.

The reaction pressure is not critical; the reaction is as a rule carried out at atmospheric or elevated pressure. The reaction between the resin and the dicarboxylic acid or anhydride thereof may take place before, during or after the reaction of the resin with the saturated monocarboxylic acid. Alternatively, the dicarboxylic acid may be present during the preparation of the cyclopentadiene resin. If desired, the cyclopentadiene may first be reacted with at least a part of the saturated monocarboxylic acid, particularly when the acid is used in a relatively large amount, and subsequently with the ethylenically unsaturated dicarboxylic acid or anhydride thereof and with the remaining part, if any, of the monocarboxylic acid.

After the cyclopentadiene resin has been reacted with carboxylic acid, the acidic reaction mixture is at least partly esterified with one or more hydroxy and/or epoxy compounds whose average OH functionality is in the range of from 2.1 to 12, and preferably in the range of from 2.2 to 4,5 (hereinafter referred to as polyol compound).

The amount of polyol compound is dependent on the mean carboxyl functionality and on the total number of carboxyl groups of the acidic reaction mixture and is generally between 0.02 and 1.8 moles per 100 grammes of non-modified cyclopentadiene resin.

As examples of suitable hydroxy and/or epoxy compounds, provided that the mixture of these compounds has a mean OH functionality of 2.1 to 12, may be mentioned monovalent alcohols such as propanol, isopropanol, butanol, nonanol, cyclohexanol, benzyl alcohol; divalent alcohols such as ethylene glycol, propylene glycol, 2,2-dimethyl-1,3-propane diol, 2-methyl-2-phenyl-1,3-propane diol, diethylene glycol, cyclohexane diol, 1,2-bis-hydroxymethyl-cyclohexane, 1,4-bis-hydroxymethyl-cyclohexane, 2,2-bis-(4-hydroxycyclohexyl)-propane, 1,1-isopropylidene bis(paraphenylene-oxy)di-ethanol, 1,1-isopropylidene-bis(paraphenylene-oxy)di-2-propanol; polyvalent alcohols containing three or more hydroxyl groups per molecule such as glycerol, trimethylol propane, trimethylol ethane, 1,2,6-hexane triol, pentaerythitol, di- and polypentaerythritol, sorbitol, insiotol, epoxy compounds such as propylene oxide, glycidol, epoxy butane, epoxy alkyl esters of aliphatic, aromatic and cycloaliphatic monocarboxylic acids and compounds such as ethanol amine and triethanol amine.

The esterification reaction is usually carried out at temperatures in the range of 140° to 300° C, and preferably in the range of 160° to 280° C. The water formed in the esterification reaction may be removed in the known way, and is generally done by azeotropic distillation with the use of organic solvents such as toluene or xylene.

The above-described modified cyclopentadiene resin may be even further adapted by carrying out the aforementioned esterification reaction in the presence of a phenol aldehyde resin. It is preferred to use as such a resin a low-condensated phenol formaldehyde resin of the resol type. The phenol resin is generally used in an amount of 1 to 60 parts by weight, and preferably in an amount of 10 - 40 parts by weight per 100 parts by weight of modified cyclopentadiene resin. If desired, still other compounds may be added to the reaction mixture during or after the reaction; for instance: abietic acid, mineral oils, pigments, colourants, waxes, asphalt compounds, linseed oil, linseed stand oil and polymeric compounds such as alkyd resins and chlorinated rubber.

The phenol resin may be prepared in a known manner from one or more phenols and one or more aldehydes in an alkaline medium at temperatures in the range of from 30° to 150° C. Examples of suitable phenols are phenol alone, alkyl phenols, alkoxy phenols, alkaryl phenols, aralkyl phenols and bisphenols; the phenols generally have 6 - 16 carbon atoms. Suitable aldehydes are for instance: fomaldehyde, acetaldehyde, propionaldehyde, butyraldehyde, and isobutyraldehyde. The molar ration between the phenol and the aldehyde is between 1 : 1 and 1 : 2.

The invention is further described in the following nonlimitative examples. In them the softening point is determined in accordance with the "ring and ball" method (ASTM method E 28-67), and the colour is measured by comparison of a 50% solution of the resin in toluene in accordance with ASTM method D 1544-68 (Gardner color scale), and the viscosity is determined in a 50% solution of the resin in toluene at 20° C.

EXAMPLE 1

In a flask 732 grammes of a commercially available cyclopentadiene resin having a melting point of 85° C and a colour 8 were molten and subsequently mixed with 356 grammes (2.78 moles) of hexahydrobenzoic acid and 117.6 grammes (1.2 moles) of maleic anhydride. Next, the mixture was heated to 240° C, at which temperature it was kept for 2 hours. Although in this stage no reaction water was formed, the acid number was found to have decreased. Subsequently, 207 grammes (1.533 moles) of trimethylol propane were slowly added, after which the mixture was allowed to react for 4 hours at 260° C. There were obtained 1350 grammes of clear resin having an acid number of 12.7, a viscosity of 280 cP, a softening point of 145° C and a colour 12. In the preparation of a rotogravure ink the pigment magenta was mixed with a toluene solution of the resulting resin and subsequently ground. At an application viscosity of 30 cP the weight ratio resin : toluene : magenta was 30 : 62.5 : 7.5. After being printed on natural paper, the rotogravure ink showed a rapid solvent emission, a fast drying time, a high rub resistance and a good gloss.

EXAMPLE 2

In a flask 732 grammes of cyclopentadiene resin having a melting point of 105° C and a colour 8 were molten and mixed with 76 grammes (0.48 moles) of trimethyl caproic acid, 61.5 grammes (0.48 moles) of hexahydrobenzoic acid and 58.8 grammes (0.6 moles) of maleic anhydride. The resulting mixture was heated to 240° C in an inert gas atmosphere and at atmospheric pressure, at which temperature it was kept for 2 hours. Subsequently 64.8 grammes (0.48 moles) of trimethylol propane and 12.5 grammes (0.12 moles) of neopentyl glycol were added and heated to 260° C. After a reaction time of 4.5 hours at 260° C a clear, light-coloured resin was obtained, having an acid number of 13.5, a viscosity of 150 cP, a softening point of 152° C and a colour 10.

In the preparation of an offset-lithographic ink the pigment magenta was mixed with the above-described binder, an air-drying isophthalic alkyd resin with an oil length of 65 (available under the trade name Setalin V 428 and marketed by Kunstharsfabriek Synthese), and a mineral oil (marketed by Magic Bros. under the trade name Magiesol 47) and subsequently ground. The weight ratio of binder : alkyd resin : mineral oil : pigment was 34 : 3.4 : 46 : 16.6 at an application viscosity of 250 P at 20° C. After having been printed on paper, the offset ink showed a good gloss, a brilliant colour, excellent rub resistance and a short drying time.

In the same way as indicated in Example 1 the binder prepared in this example was processed into a rotogravure ink which after being printed on natural paper had the same favourable properties as mentioned in Example 1.

EXAMPLE 3

In a flask 610 grammes of cyclopentadiene resin having a melting point of 85° C and a colour 7 were molten and subsequently mixed with 439 grammes (3.6 moles) of benzoic acid and 98 grammes (1.0 mole) of maleic acid. The resulting mixture was heated for 2 hours to 240° C under xylene reflux. subsequently, 172.5 grammes (1.25 moles) of pentaerythritol were added slowly. After 5 hours' reaction at 260° C the resin was kept at reduced pressure for 30 minutes to remove the remaining xylene. The product obtained was a clear, toluene-soluble resin having an acid number of 10, a viscosity of 260 cP, a softening point 156° C and a colour 11. A rotogravure ink made from this resin displayed excellent properties, especially as regards drying speed.

For comparison this example was repeated, except that instead of benzoic acid an equimolar amount of stearic acid was used. The resulting resin had an acid number of 11, a viscosity to 40 cP, a colour 14 and a very low softening point (40° C). Because of the low softening point, the sticky surface and incomplete solubility in toluene the resin was totally unsuitable for use as a binder in rotogravure ink.

EXAMPLE 4

In a flask 610 grammes of cyclopentadiene resin having a melting point of 105° C and a colour 7 were molten and subsequently mixed with 240 grammes (1.0 mole) of napthenic acid and 98 grammes (1 mole) of maleic anhydride. The mixture was heated for 2 hours at 240° C, after which 172.5 grammes (1.25 moles) of pentaerythritol and 317 grammes (2.6 moles) of benzoic acid were added, The reaction mixture was kept at 260° C for 5 hours, use being made of azeotropic distillation with the aid of xylene to accelerate the esterification reaction and to prevent sublimation of starting materials. After the resin mass had been kept at reduced pressure for another 30 minutes to remove remaining xylene, a product was obtained which was well soluble in aromatics and had an acid number of 9, a viscosity of 350 cP, a softening point of 161° C and a colour 13. This resin, too, showed good properties in rotogravure inks.

EXAMPLE 5

In a flask 732 grammes of cyclopentadiene resin having a melting point of 82° C and a colour 8 were molten and subsequently mixed with 86.5 grammes (0.6 moles) of 2-ethyl caproic acid and 73.2 grammes (0.6 moles) of benzoic acid. The mixture was heated to 220° C for 2 hours while under xylene reflux. Next, 127.6 grammes (1.1 moles) of fumaric acid were added and the mixture was heated to 240° C, at which temperature it was kept for 2 hours. This was followed by slowly adding 151 grammes (1.45 moles) of neopentyl glycol and 13.5 grammes (0.1 mole) of trimethylol propane. After 4 hours' axeotropic distillation with xylene at 260° C a resin was obtained having an acid number of 13, a viscosity of 180 cP, a softening point of 149° C and a colour 11.

EXAMPLE 6

The procedure described in Example 5 was repeated. After the addition of the alcohol mentioned in said example, however, over a period of 1 hour and at a temperature of 180° C also 200 grammes of a low-condensated alkyl phenol resin were added which had been obtained by alkaline condensation of 1 mole of octyl phenol and 1.7 moles of formaldehyde. The resulting product was a resin having an acid number of 10, a viscosity of 350 cP, a softening point of 165° C and a colour 12. The solubility in aliphatic solvents of this product is better than that of the product mentioned in Example 5 and also the softening point and the viscosity are higher. Using an ink consisting of 29 grammes of the afore-described resin, 61.5 grammes of toluene and 7.5 grammes of magenta, excellent results were obtained, especially as far as drying time, brilliance of colour and rub resistance were concerned.

EXAMPLE 7

In a flask 750 grammes of cyclopentadiene resin having a melting point of 82° C and a colour 8 were molten and heated to 180° C. There were added, with stirring, 48.8 grammes (0.4 moles) of benzoic acid and 53 grammes (0.55 moles) of maleic anhydride. The contents of the flask were then heated to 240° C and kept at this temperature for 1 hours. Subsequently, there were slowly added 36 grammes (0.27 moles) of trimethylol propane and 19 grammes (0.137 moles) of pentaerythitol, the temperature dropping to 180° C. Over a period of 1 hour and at a temperature of 180° C 90 grammes of a low-condensated alkyl phenol resin were added, after which the reaction mixture was brought to a temperature of 260° C in 2.5 hours. After the reaction mixture had been kept at 260° C for 3 hours, a resin was obtained having a softening point of 177° C, an acid number of 7.2, a viscosity of 230 cP and a colour 11. A printing ink on the basis of the above-described binder, toluene and magenta in a weight ration of 31.5 : 61 : 7.5 showed good rotogravure ink properties.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. The process for the preparation of a printing ink binder having a basis of a cyclopentadiene resin modified with carboxylic acid and subsequently esterified, characterized in that the cyclopentadiene resin is reacted at a temperature in the range of 120° C to 300° C with an ethylenically unsaturated dicarboxylic acid or the anhydride thereof and with a saturated monocarboxylic acid having 3 – 9 carbon atoms, and the resulting acidic reaction mixture is at least partly esterified at a temperature in the range of 140° to 300° C with one or more hydroxy and/or epoxy compounds whose average OH functionality is in the range of 2.1 to 12.

2. The process according to claim 1, characterized in that the amount of saturated monocarboxylic acid is 0.01 to 1 mole per 100 grammes of cyclopentadiene resin.

3. The process according to claim 2, characterized in that the amount of saturated monocarboxylic acid is 0.02 to 0.8 moles per 100 grammes of cyclopentadiene resin.

4. The process according to claim 1, characterized in that as a saturated monocarboxylic acid an aliphatic monocarboxylic acid with 6 – 9 carbon atoms is used.

5. The process according to claim 4, characterized in that the aliphatic monocarboxylic acid has a branched carbon chain.

6. The process according to claim 1, characterized in that the acidic reaction mixture is esterified with one or more hydroxy and/or epoxy compounds whose OH functionality is in the range of 2.2 to 4.5.

7. The printing ink binder obtained by the process according to claim 1.

* * * * *